US007568184B1

(12) United States Patent
Roth

(10) Patent No.: US 7,568,184 B1
(45) Date of Patent: Jul. 28, 2009

(54) SOFTWARE DOCUMENTATION GENERATOR

(75) Inventor: Mark L. Roth, Brooklyn, NY (US)

(73) Assignee: Sun Microsystems, Inc., Santa Clara, CA (US)

( * ) Notice: Subject to any disclaimer, the term of this patent is extended or adjusted under 35 U.S.C. 154(b) by 852 days.

(21) Appl. No.: 10/824,282

(22) Filed: Apr. 14, 2004

(51) Int. Cl.
G06F 9/44 (2006.01)

(52) U.S. Cl. .................................................. 717/123

(58) Field of Classification Search ................ 717/123, 717/107–110; 715/234, 235, 203, 523; 707/513; 709/246
See application file for complete search history.

(56) References Cited

U.S. PATENT DOCUMENTS

| | | | | | |
|---|---|---|---|---|---|
| 4,860,203 | A | * | 8/1989 | Corrigan et al. | 717/123 |
| 5,903,897 | A | * | 5/1999 | Carrier et al. | 707/203 |
| 6,336,217 | B1 | * | 1/2002 | D'Anjou et al. | 717/121 |
| 6,389,481 | B1 | * | 5/2002 | Malcolm | 719/310 |
| 6,405,366 | B1 | * | 6/2002 | Lorenz et al. | 717/107 |
| 6,507,855 | B1 | * | 1/2003 | Stern | 715/513 |
| 6,732,330 | B1 | * | 5/2004 | Claussen et al. | 715/234 |
| 7,000,185 | B1 | * | 2/2006 | Murren et al. | 715/203 |
| 7,107,521 | B2 | * | 9/2006 | Santos | 715/235 |
| 7,188,336 | B2 | * | 3/2007 | Humphries | 717/123 |
| 7,290,061 | B2 | * | 10/2007 | Lentini et al. | 709/246 |
| 2002/0059348 | A1 | * | 5/2002 | Lee et al. | 707/516 |
| 2002/0111963 | A1 | * | 8/2002 | Gebert et al. | 707/513 |
| 2004/0090458 | A1 | * | 5/2004 | Yu et al. | 345/760 |
| 2004/0199876 | A1 | * | 10/2004 | Ethier et al. | 715/523 |
| 2004/0205452 | A1 | * | 10/2004 | Fitzsimons et al. | 715/500 |
| 2004/0205473 | A1 | * | 10/2004 | Fisher et al. | 715/500 |
| 2005/0060688 | A1 | * | 3/2005 | Kamalakantha | 717/123 |
| 2005/0149851 | A1 | * | 7/2005 | Mittal | 715/501.1 |

OTHER PUBLICATIONS

Expresso, "Chapter 9: Developing the View in the MVC", Mar. 2004, p. 1-8; i.e. <MVC_struts.pdf>.*
"Javadoc—The Java API Documentation Generator," http://java.sun.com/j2se/1.4.2/docs/tooldocs/windows/javadoc.html, 2002, (58 pages).
Donald M. Leslie, "Using Javadoc and XML to Produce API Reference Documentation," SIGDOC '02, Oct. 20-23, 2002, (pp. 104-109).
David Thurmond, "Code Smarter, Not Harder, With Xdoclet," http://www.developer.com/java/eib/print.php/3102481, Oct. 31, 2003, (12 pages).

* cited by examiner

Primary Examiner—Tuan Anh Vu
(74) Attorney, Agent, or Firm—Robert C. Kowert; Meyertons, Hood, Kivlin, Kowert & Goetzel, P.C.

(57) ABSTRACT

Various embodiments of a system and method for generating software documentation are disclosed. A software documentation generator may input a variety of information sources. In one embodiment, these information sources may include various types of files such as application source code files, tag library files, tag library descriptors (TLD), library source code, web services description language (WSDL) files, configuration files, defect reports, and text files. The software documentation generator may analyze each source to determine its type and use this information to extract documentation data from the source according to the format of the data included in that source. The software documentation generator may reformat the documentation data extracted from each source into a uniform format and aggregate the uniformly formatted data into a uniformly formatted aggregate input document. The software documentation generator may transform this document into one or more sets of software documentation in a specified format.

30 Claims, 7 Drawing Sheets

SOFTWARE DOCUMENTATION GENERATOR

BACKGROUND

1. Field of the Invention

This invention relates to computer systems, and more particularly to the generation of documentation for software.

2. Description of the Related Art

Applications are often implemented as part of commercial and/or non-commercial business solutions for an enterprise. For example, a company may leverage use of an enterprise application that includes various databases distributed across multiple computers. The code for an enterprise application may include hundreds of thousands of lines written by numerous programmers over a period of many months or years. The cost to develop and support such applications in terms of manpower can be tremendous.

Software that is well documented is easier to use, debug, modify, and maintain than undocumented or poorly documented applications. Therefore, the lifecycle costs associated with large applications can be reduced by insuring that proper documentation is produced. One type of software documentation includes comments that are written into the source code usually by the developer. These comments typically describe the detailed function of a small portion of the code that the developer deems to be not intuitively obvious. Another level of documentation is usually written separately from the source code in the form of a functional and/or architectural specification. This level of documentation may describe the function of the entire application as a whole and that of the major component modules. Typically, all levels of software application documentation are incomplete, haphazardly written, or non-existent due to schedule or budgetary constraints and/or a lack of enthusiasm for writing documentation on the part of the developers.

Software developers may leverage existing libraries of code to reduce their total time spent in development and to reduce the frequency of defects in their applications and components. In order to realize the benefits of leveraging these libraries, software developers must first understand how to interface with them, making accurate and up-to-date library documentation an important part of the software development process. To maximize productivity gains, it is also important for such library documentation to be indexed and easy to browse by the software developer. Developers may have different preferences for the final formatting of the library documentation, so that they can access the information in a manner best suited to their needs.

Developers of software libraries may wish to include such documentation in their libraries. Typically, information that is included in such software documentation comes from a variety of sources, each of which may be in a different format. These sources usually include the library source code itself and may additionally include configuration files, defect reports and other sources. It is both time-consuming and error-prone for component library developers to extract such information and to produce documentation in the required format by hand.

SUMMARY

Various embodiments of a system and method for generating software documentation are disclosed. A software documentation generator may input a variety of information sources. In one embodiment, these information sources may include various types of files such as application source code files, tag library files, tag library descriptors (TLD), library source code, web services description language (WSDL) files, configuration files, defect reports, and text files. The software documentation generator may analyze each source to determine its type and use this information to extract documentation data from the source according to the format of the data included in that source. The software documentation generator may reformat the documentation data extracted from each source into a uniform format and aggregate the uniformly formatted data into a uniformly formatted aggregate input document. The software documentation generator may transform this document into one or more sets of software documentation in a specified format.

The software documentation generator may include an input source aggregator. The input source aggregator may, in turn, include a variety of input source plug-ins. A plug-in may be an application module that can be readily added to or incorporated into another application in order to augment the functionality of the original application. For example, there are many plug-ins available for Internet web browsers that allow the playing of audio and video files of various formats.

Each input source plug-in included in input source aggregator may correspond to the file type and/or information format of one or more of the input source files. Once the input source aggregator has analyzed an input source, it may select an input source plug-in corresponding to the file type and data format of that input source. The selected plug-in may extract documentation information from the corresponding input source. Each input source plug-in may reformat the data it extracts from corresponding input sources into a uniform aggregate format and append the data to the uniformly formatted aggregate input document.

In one embodiment, a software documentation generator may include a transformer, which may operate on the uniformly formatted aggregate input document to produce software documentation sets. Depending upon the desired format for the documentation sets, the transformer may be configured to include one or more transformer plug-in sets. Each element of a transformer plug-in set may parse the uniformly formatted aggregate input document and extract a subset of the documentation information included therein. This extracted information may be combined with formatting and other information included in or generated by the plug-in to produce one or mode elements of the corresponding documentation set. An output documentation set may include documentation for application programming interfaces (API) provided by a software library. The documentation set may include plain text files, files in portable document format (PDF), hypertext markup language files (HTML), etc.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Figure 1:
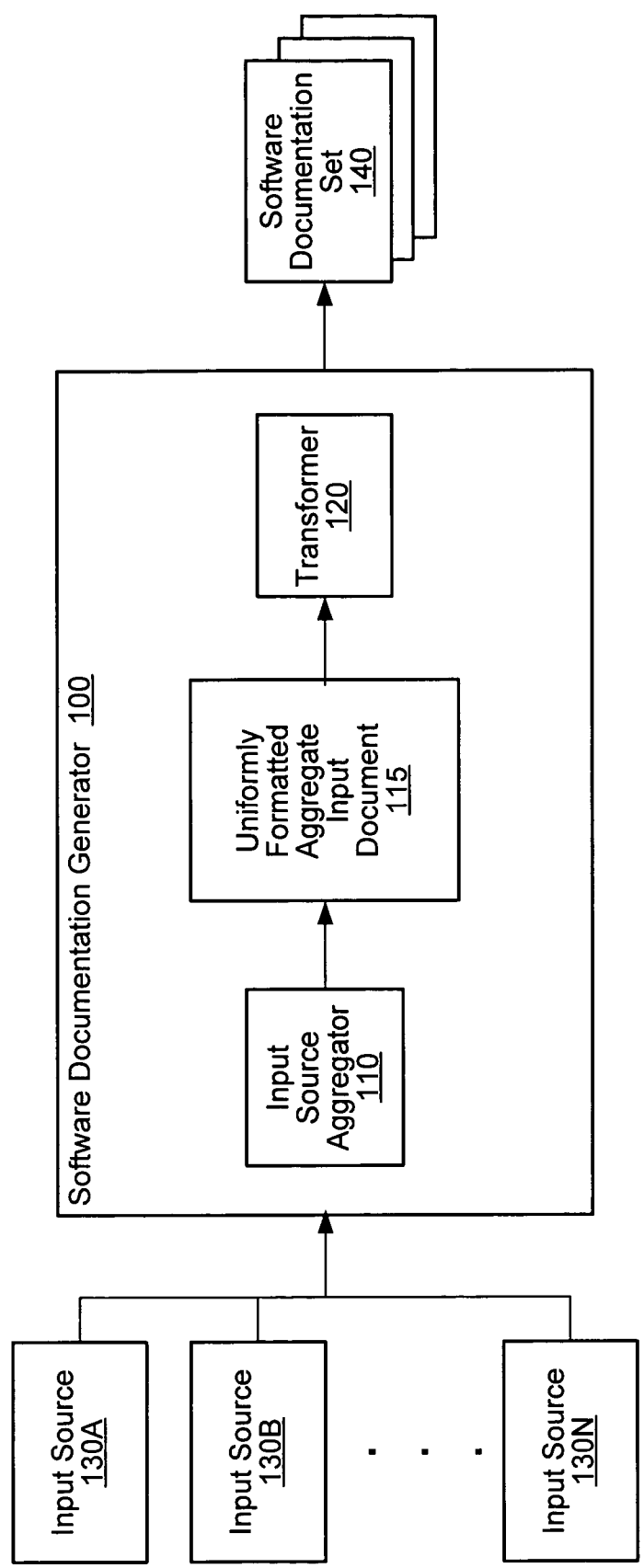
FIG. 1 illustrates a software documentation generator, according to one embodiment.

FIG. 1 illustrates a software documentation generator 100, according to one embodiment. Software documentation generator 100 may extract information from input sources 130 to produce software documentation set 140. In one embodiment, software documentation generator 100 may include input source aggregator 110 and transformer 120. Input source aggregator 110 may extract information included in input sources 130 in a variety of formats. Input source aggregator 110 may reformat the information extracted form each input source 130 and combine all the extracted information into a single document in a uniform format. This uniformly formatted aggregate input document 115 output from input source aggregator 110, may serve as input to transformer 120. Transformer 120 may analyze the output from input source aggregator 110 and extract portions of the included information to produce components of software documentation set 140 in a variety of formats. Transformer 120 may be configurable to produce components of software documentation set 140 in desired formats.

In one embodiment, input sources 130 may be files associated with Java Server Pages (JSP) tag libraries. JSP technology may enable Web developers and designers to develop and maintain dynamic Web pages that leverage existing business systems. As part of the Java technology family, JSP technology may enable development of Web-based applications that are platform independent. JSP technology may separate the user interface from content generation, enabling designers to change the overall page layout without altering the underlying dynamic content.

JSP technology may use XML-like tags that encapsulate the logic that generates the content for a Web page. The application logic can reside in server-based resources that the page accesses by means of these JSP tags. Any and all formatting HTML or XML tags are passed directly back to the response page. By separating the page logic from its design and display and supporting a reusable component-based design, JSP technology may facilitate the development of Web-based applications.

JSP technology may include the JavaServer Pages Standard Tag Library (JSTL). The JSTL may encapsulate as simple tags the core functionality common to many Web applications. The JSTL may include support for common, structural tasks such as iteration and conditionals, tags for manipulating XML documents, internationalization tags, and structured query language (SQL) tags. It may also provide a framework for integrating existing custom tags with JSTL tags.

Web page developers may draw upon the resources available in the JSTL by using the included tags in their documents. In addition, developers may create their own custom tags to augment those in the JSTL. A custom tag may be a user-defined JSP technology page element. When a JSP technology page containing a custom tag is translated into a Java Servlet, the tag may be converted to operations (method calls) on an object called a tag handler. The servlet engine may then invoke those operations when the JSP technology page's servlet is executed.

In JavaServer Pages technology, actions may be elements that can create and access programming language objects and affect the output stream. In addition to the standard actions, the JSP v1.1 specification supports the development of reusable modules called custom actions. A custom action may be invoked by using a custom tag in a JSP technology page. A tag library may be a collection of custom tags. Some examples of tasks that can be performed by custom actions include form processing, accessing databases and other enterprise services such as email and directories, and flow control. Before the availability of custom actions, JavaBeans components in conjunction with scriptlets were the main mechanism for performing such processing.

There may be two types of components for a tag library; Tag Library Descriptor (TLD) files and tag handlers. A tag library descriptor may be an XML document that describes a tag library. A TLD may include information about a library as a whole and about each tag included in the library. TLDs may be used by a JSP technology container to validate the tags and by JSP technology page development tools. The following TLD elements may be used to define a tag library:

```
<taglib>
    <tlibversion>  - The tag library's version
    <jspversion>   - The JSP specification version the tag library depends
                     on
    <shortname>    - A simple default name that could be used by a JSP
                     page authoring tool to create names with a mnemonic
                     value; for example, shortname may be used as the
                     preferred prefix value in taglib directives and/or to
                     create prefixes for IDs.
    <uri> - A URI that uniquely identifies the tag library
    <info> - Descriptive information about the tag library
    <tag>
    ...
    </tag>
    ...
</taglib>
```
The TLD element required for all tags is the one used to specify a tag handler's class:
```
    <tag>
      <tagclass>classname</tagclass>
      ...
    </tag>
```

Note that the specific format of a TLD may vary from one library to another according to which version of the JSP specification is targeted by each library. The same library may have a TLD in multiple formats if it targets multiple different versions of the JSP specification. The software documentation generator 100 may provide a documentation abstraction from these different formats.

Referring again to FIG. 1, input sources 130 may represent a collection of tag libraries, in one embodiment. Software documentation generator 100 may be configurable to operate on a single TLD, a set of TLDs, a JAR file, a WAR file, a directory of tag files, or all the tag libraries in a web application. Software documentation generator 100 may extract the information required for the generation of software documentation set 140 from input sources 130 and output the extracted information in documents of a desired format.

Figure 2:
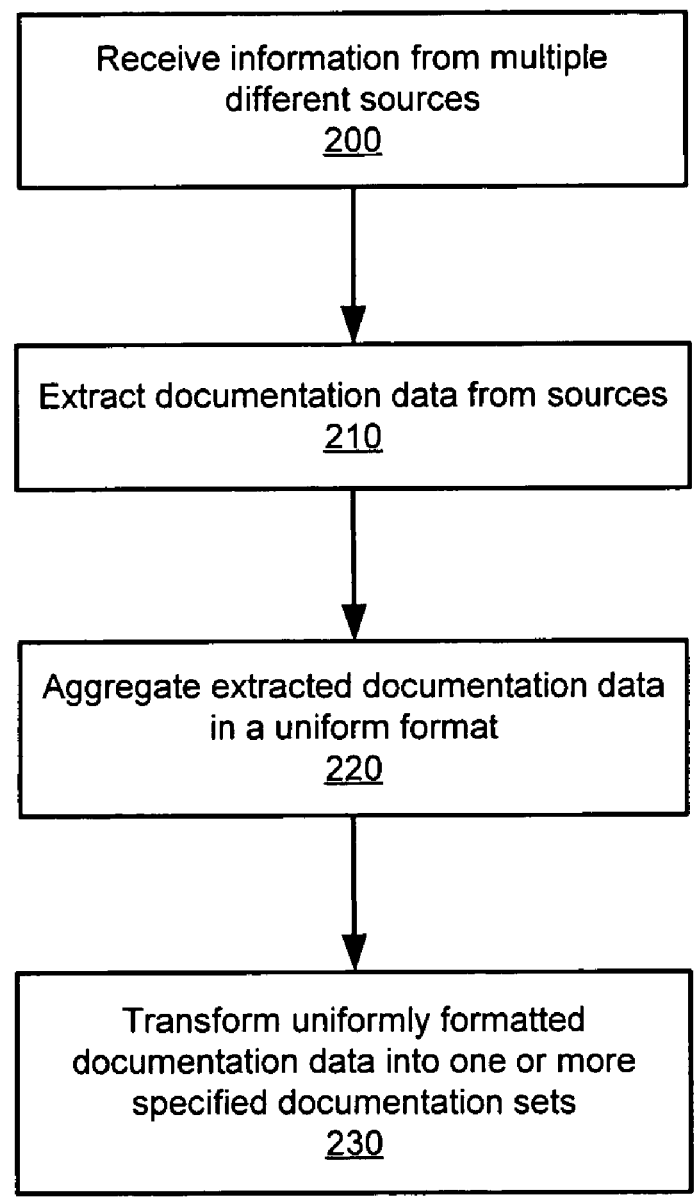
FIG. 2 is a flowchart of one embodiment of a method for operating a software documentation generator.

FIG. 2 is a flowchart of one embodiment of a method for operating a software documentation generator. At block 200, the software documentation generator may receive a variety of input sources. These input sources may include tag library files, library source code, configuration files, defect reports, text files, and other types of sources. Each input may be analyzed to determine its type and/or the format of the data it includes. For example, the input sources may include several tag libraries. The TLD associated with each tag library may include data in a different format from the others.

Based on this analysis, the software documentation generator may extract information from each source input according to a different format, as depicted in block 210. The data thus extracted may be combined with the data from the other input sources and reformatted to comply to a uniform format, as indicated in block 220. In one embodiment, the extracted information may be aggregated and formatted into XML or another document format for use internally by the software documentation generator. This uniformly formatted document may then be parsed into sections for inclusion in components of the software documentation set. The information required for a particular component of the software documentation set may be reformatted to produce a document in a specified document type and output from the software documentation generator, as illustrated by block 230. Document sets may be produced in multiple, different formats.

Figure 3:
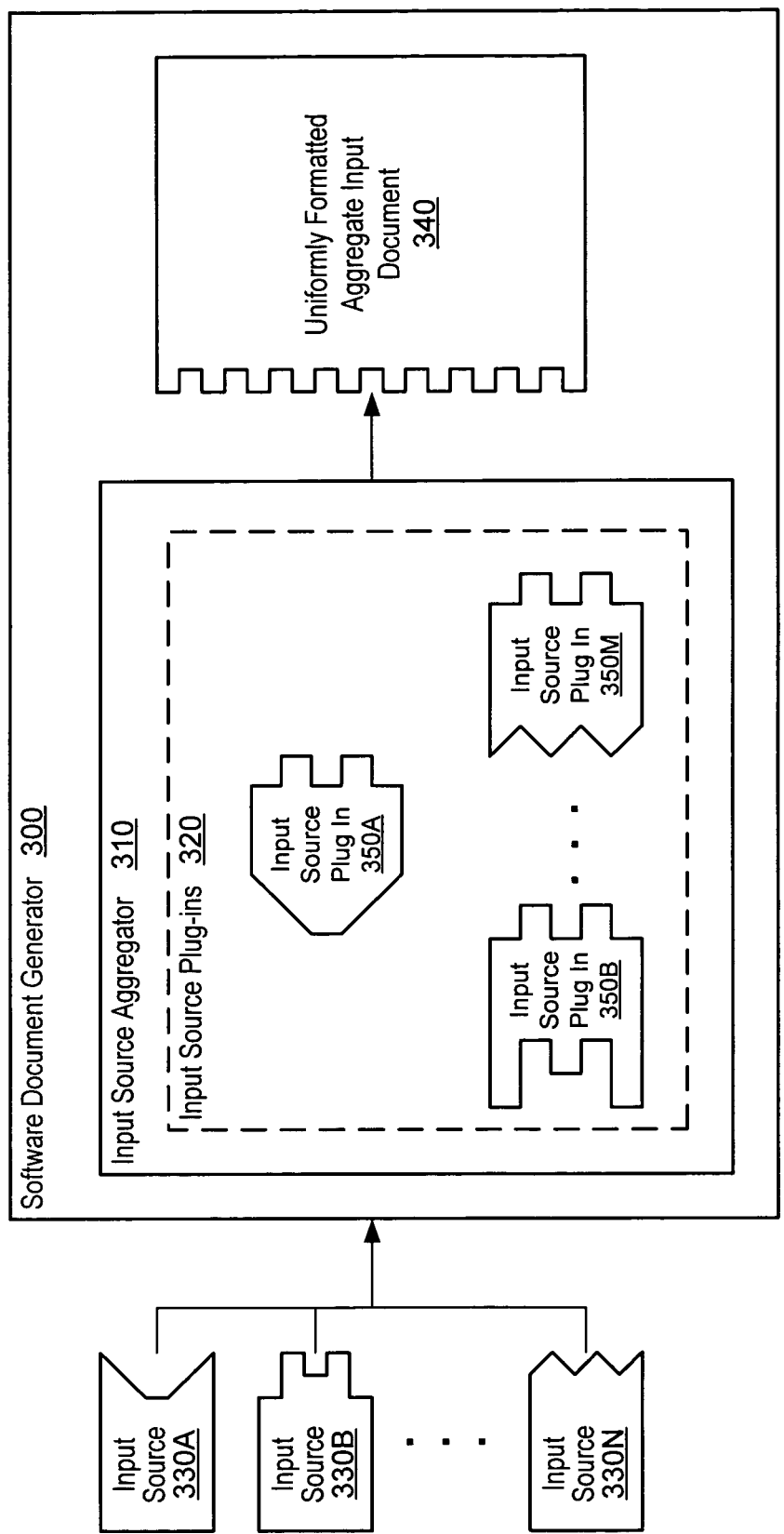
FIG. 3 illustrates the components of an input source aggregator, according to one embodiment.

FIG. 3 illustrates the components of an input source aggregator, according to one embodiment. As described previously, a software documentation generator 300 may include an input source aggregator 310, which operates on input sources 330. Input sources 330 may include files of various types. Each file type may include information in a format that is different from the format of information included in files of other types. Input source aggregator 310 may include a group of input source plug-ins 320. A plug-in may be an application module that may be readily added to or incorporated into another application in order to augment the functionality of the original application.

Each input source plug-in 350 included in input source aggregator 310 may correspond to the file type and/or information format of one or more of the input source files 330. Once the input source aggregator 310 has analyzed an input source 330, it may select an input source plug-in 350 corresponding to the file type and data format of that input source. The selected input source plug-in 350 may extract documentation information from the corresponding input source. For example, if input source 330A is a TLD whose data is in JSP 1.2 format, an input source plug-in 350A specifically designed for this file type and data format may be employed to parse the file for the needed data. Each input source plug-in 350 may reformat the data it extracts from corresponding input sources 330 into a uniform format and append it to the uniformly-formatted aggregated input document 340.

In some cases, an input source plug-in 350 may generate additional documentation information, not included in a corresponding input source 330 for inclusion in uniformly formatted aggregate input document 340. In one embodiment, the documentation information included in uniformly formatted aggregate input document 340 may be formatted according to the JSP 2.0 specification. If an input source 330B is a TLD formatted according to JSP 1.2, the corresponding input source plug-in 350B may be selected to extract documentation data from the source. The format of the uniformly formatted aggregate input document 340 may specify additional documentation information beyond that provided by input source 330B. The needed information may take the form of additional data fields or additional data within existing fields. Input source plug-in 350B may detect the absence of the needed documentation information and supply the necessary data for the uniformly formatted aggregate input document 340. For example, if an input source 330A is a TLD in JSP 1.1 format and uniformly formatted aggregate input document 340 is formatted according to JSP 2.0, a corresponding input source plug-in 350A may extract data included in the TLD and add default values for fields specified in JSP 2.0 that are not present in the JSP 1.1 TLD file.

Figure 4:
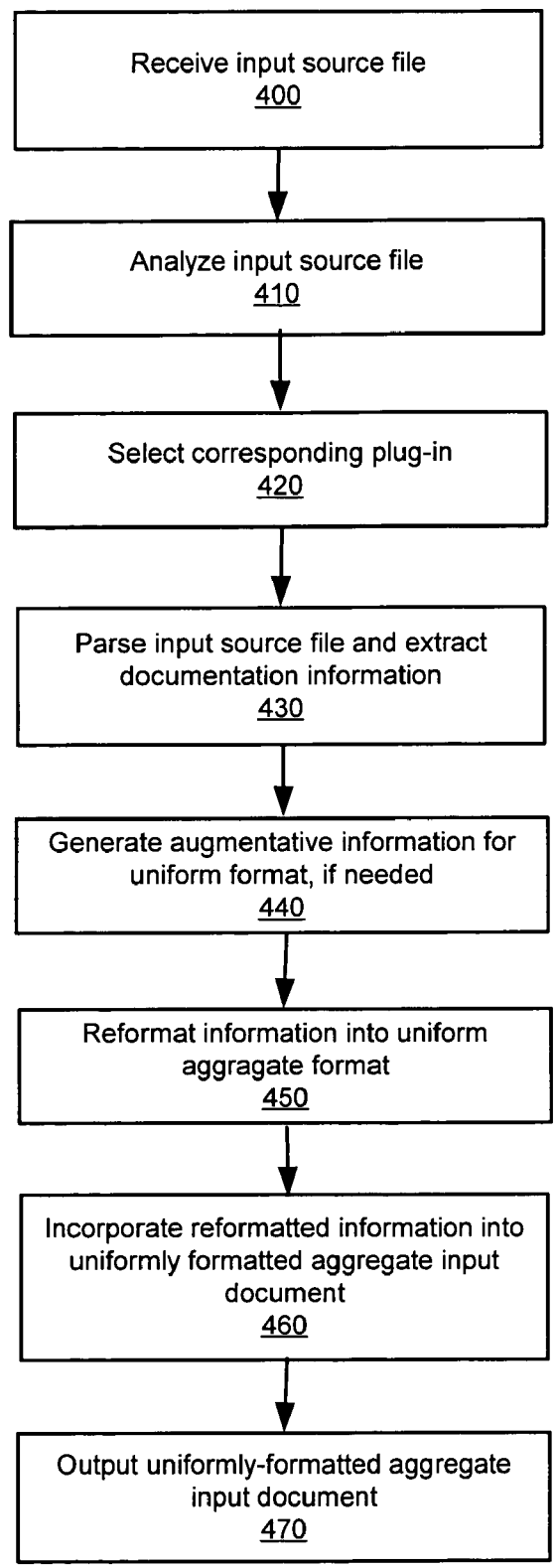
FIG. 4 is a flowchart of a method for operating an input source aggregator, according to one embodiment.

FIG. 4 is a flowchart of a method for operating an input source aggregator, according to one embodiment. At 400, the input source aggregator may receive an input source file. The input source aggregator may analyze the input file to determine both the file type and the format of the data included in the file, as shown at block 410. The type of input source files may include application source code files, tag library files, TLDs, library source code, web services description language (WSDL) files, configuration files, defect reports, and plain text files. The formats of data included in input source files may vary both from file type to file type and also within a single file type. For example, the format of the documentation data included in a TLD written according to the JSP 1.2 specification may differ from a JSP 2.0 compliant TLD.

Based on the type of input source file received and the format of the data included in the input source file, the input source aggregator may select a corresponding plug-in to extract data from the input source file, as illustrated in block 420. For example, if the input source file is an XML type file whose data is formatted as a TLD, then a particular plug-in configured to parse XML TLD files may be selected. In one embodiment, input source aggregator may analyze an input file and determine that no input source plug-in corresponding to the required file type and data format has been installed in the included input source plug-in set. Under these conditions the software documentation generator may generate a message to the user informing him of the problem and requesting the installation of the required input source plug-in.

At 430 the selected plug-in may parse the input source file and extract the data needed for the generation of the software documentation set. In some embodiments, the selected plug-in may generate data needed for the uniformly formatted aggregate input document when such data is not included in the input source file, as indicated at block 440. As shown at 450, the plug-in may reformat the extracted and/or generated documentation information into the required uniform format and incorporate the properly formatted data into the uniformly formatted aggregate input document, as indicated in block 460. Once documentation information from all input sources has been extracted, reformatted, and combined it may be output from the input source aggregator as the uniformly formatted aggregate input document, in block 470. The uniformly formatted aggregate input document may serve as the input to the transformer component of the software documentation generator, as described below.

Figure 5:
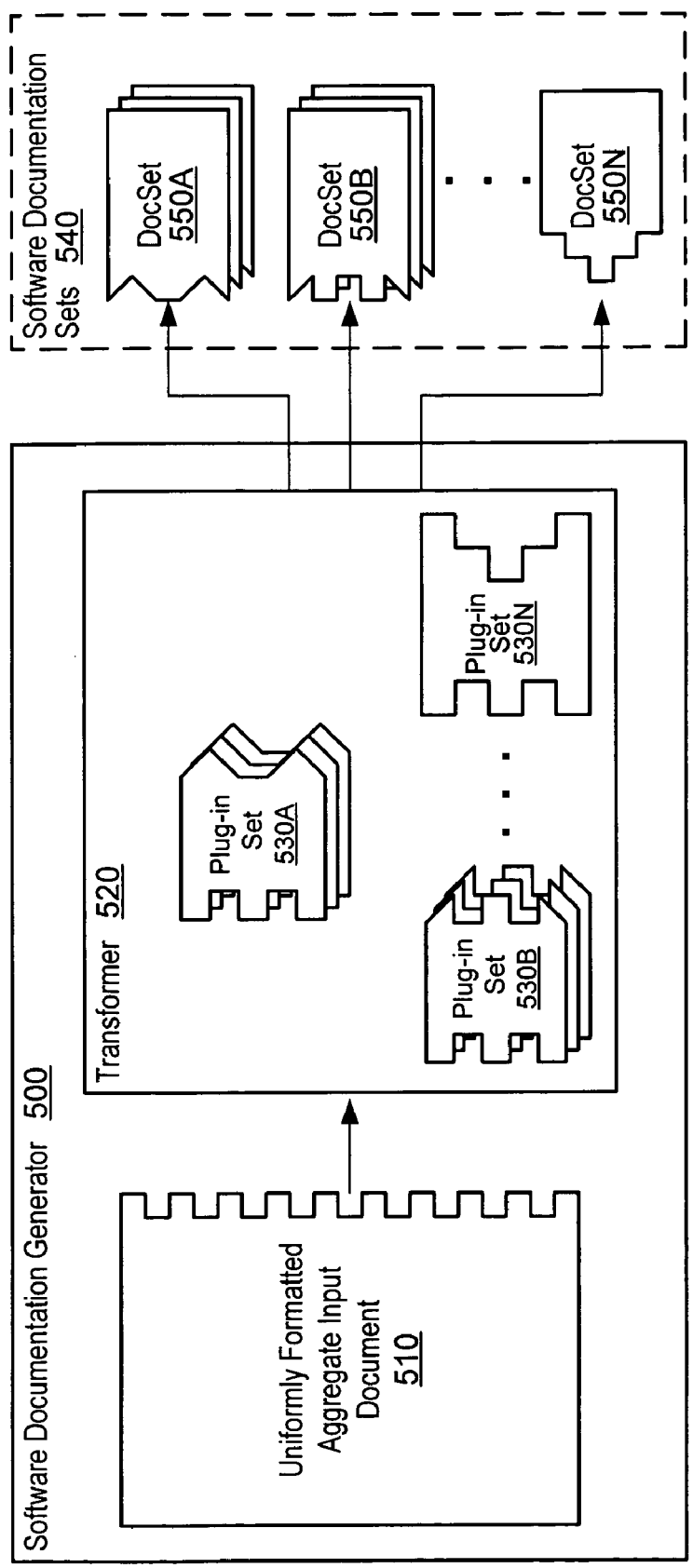
FIG. 5 illustrates the transformer component of a software documentation generator, according to one embodiment.

FIG. 5 illustrates the transformer component 520 of a software documentation generator 500, according to one embodiment. Transformer 520 may operate on uniformly formatted aggregate input document 510 to produce software documentation sets 540. Depending upon the desired format for documentation sets 550, transformer 520 may be configured to include one or more transformer plug-in sets 530. In one embodiment, Transformer 520 may include an XSLT processor. Uniformly formatted aggregate input document 510 may be an XML document, and a transformer plug-in set 530 may include one or more XSL style sheets. A style sheet may define how a document is to be formatted for printed output, display at a terminal, inclusion in a Web page, or other purposes.

Transformer 520 may apply an element of a plug-in set 530A to uniformly formatted aggregate input document 510 to produce a corresponding element of document set 550A. In one embodiment, uniformly formatted aggregate input document 510 may be compiled from a set of TLD input sources and may be formatted as an XML document. Transformer 520 may apply an element of a plug-in set 530A to the XML document to produce an HTML document that includes the names of the tag libraries corresponding to the TLDs and specifies how these names are to appear on a terminal display. The application of another element of a plug-in set 530A to uniformly formatted aggregate input document 510 may produce another HTML document that includes the tags included in the tag libraries along with a presentation specification. The application of yet another element of a plug-in set 530A to uniformly formatted aggregate input document 510 may produce yet another HTML document that includes the API for the tags included in the tag libraries and again may include a presentation specification.

Each element of a transformer plug-in set 530 may parse uniformly formatted aggregate input document 510 and extract a subset of the documentation information included therein. This extracted information may be combined with formatting and other information included in the plug-in set 530 to produce one or mode elements of the corresponding documentation set 550. As an example, an XSLT processor may apply a style sheet which is one element of a transformer plug-in set 530B to a uniformly formatted aggregate input document 510 extracted from a set of TLDs to produce an element of documentation set 550B including sample tag library directives that can be copied and pasted directly into a JSP page in order to make use of the included tags.

Similar to as described above for input source plug-ins 350, a transformer plug-in set 530 may generate additional documentation information, not included in uniformly formatted aggregate input document 510 for inclusion in documentation set 550. In one embodiment, the additional information may take the form of additional data fields or additional data within existing fields.

Figure 6:
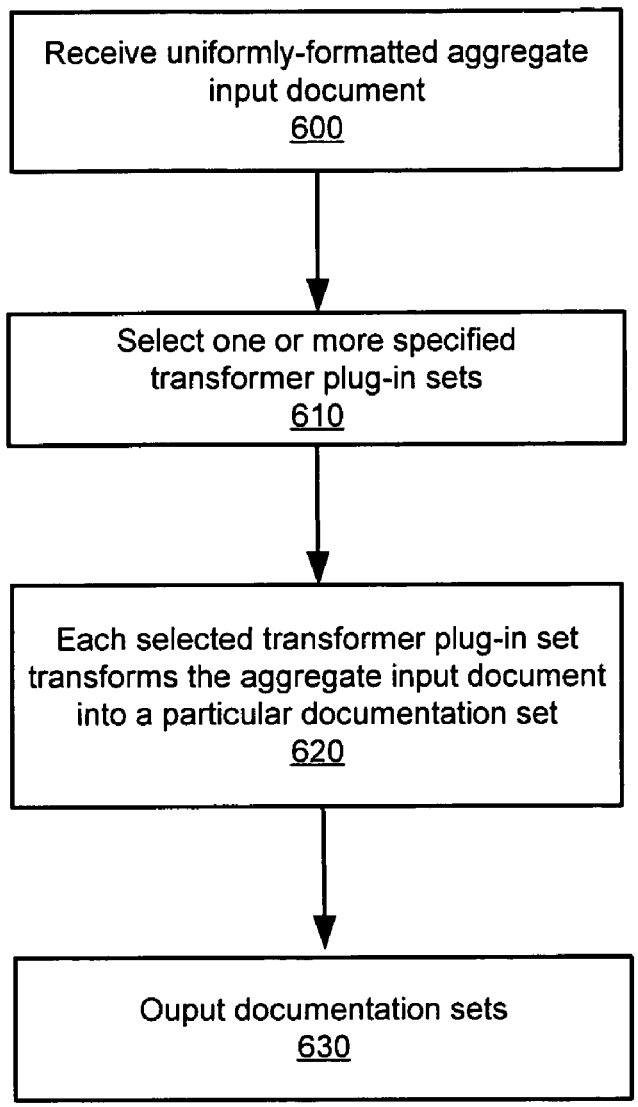
FIG. 6 shows a flowchart of one embodiment of a method for operating a uniformly formatted aggregate input document translator.

FIG. 6 is a flowchart of a method for operating a uniformly formatted aggregate input document translator, according to one embodiment. At 600, the translator may receive a uniformly formatted aggregate input document. In one embodiment, the uniformly formatted aggregate input document may be an XML document whose documentation information is extracted from a set of TLDs. As indicated by block 610, the transformer may apply a specified transformer plug-in set to the uniformly formatted aggregate input document. In some embodiments, the user may specify the particular transformer plug-in set to be used by indicating the desired format for the software documentation set. In other embodiments, the document transformer may use a default plug-in set. Multiple sets may be specified to produce documentation sets in different formats.

Each element of an applied transformer plug-in set may operate on the uniformly formatted aggregate input document to extract a portion of the documentation information and combine this extracted information with output formatting instructions to produce one or more elements of a corresponding documentation set, as indicated by block 620. For example, one such element may produce a plain text document listing the name of each library of the source TLDs on a separate line. When the elements of the transformer plug-in set have extracted their documentation data and generated their documents, the finished documentation sets may be output, as described in block 630. In one embodiment, the software documentation sets may be output as hardcopy while in another they may be output as a set of files such as plain text, PDF, or other files types for word processors or browsers. In another embodiment, the software documentation generator may output the documentation sets as an information stream to one or more Web pages where it may be combined with existing formatting information for dissemination.

Figure 7:
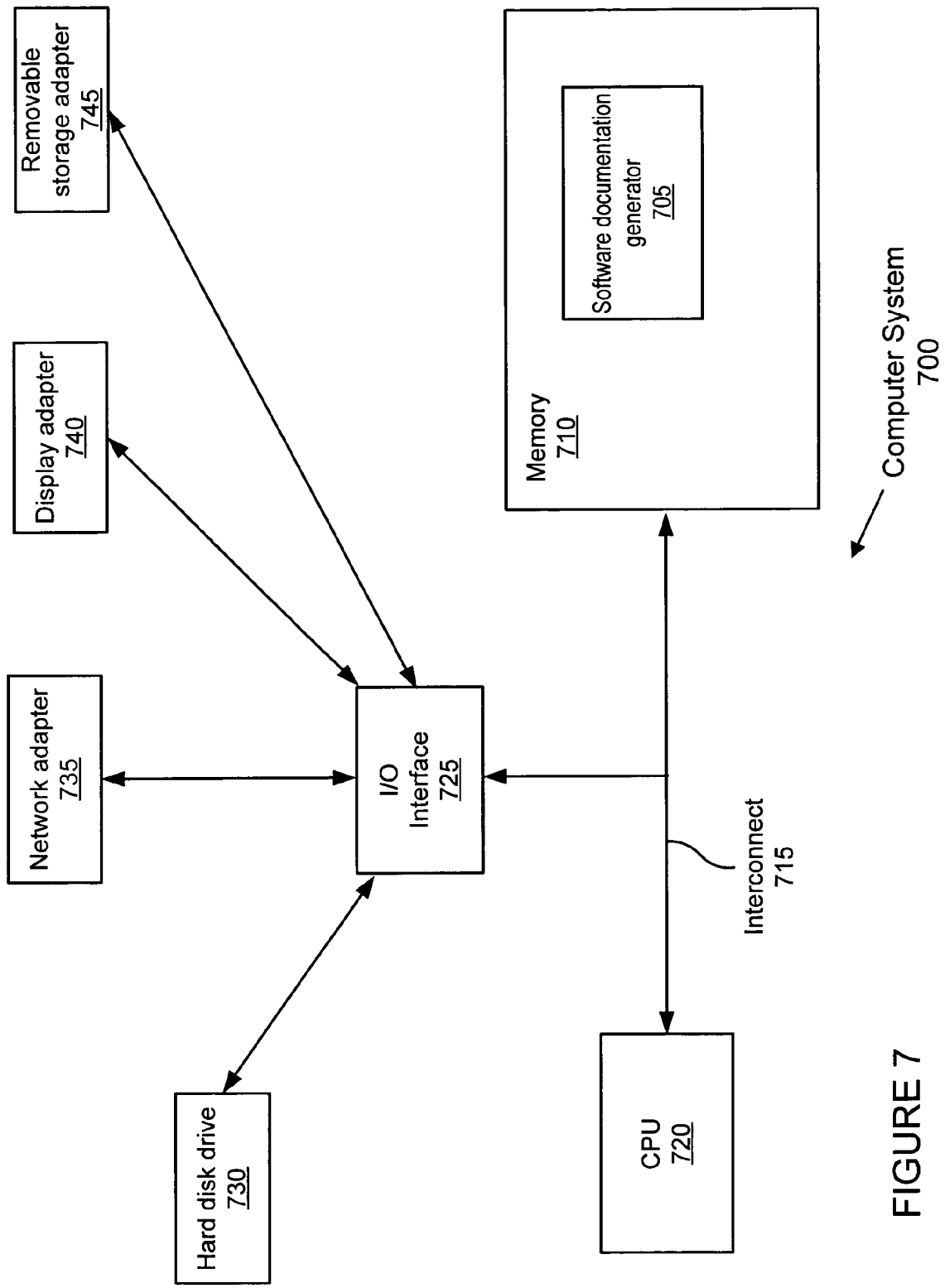
FIG. 7 illustrates an exemplary computer system that may include one embodiment of a software documentation generator.

FIG. 7 illustrates one embodiment of a computer system 700 that may include a software documentation generator 705 as described herein. Computer system 700 may include many different components such as memory 710, a central processing unit (CPU) or processor 720, and an input/output (I/O) interface 725. Interconnect 715 is relied upon to communicate data from one component to another. For example, interconnect 715 may be a point-to-point interconnect, a shared bus, a combination of point-to-point interconnects and one or more buses, and/or a bus hierarchy including a system bus, CPU bus, memory bus and I/O buses such as a peripheral component interconnect (PCI) bus.

The computer system 700 preferably includes a memory medium on which computer programs according to various embodiments may be stored. The term "memory medium may include an installation medium, e.g., a CD-ROM, or floppy disk; a computer system memory such as DRAM, SRAM, EDO DRAM, SDRAM, DDR SDRAM, Rambus RAM, etc., or a non-volatile memory such as a magnetic media, e.g., a hard drive 730, or optical storage. The memory medium may include other types of memory as well, or combinations thereof. In addition, the memory medium may be located in a first computer in which the programs are executed, or may be located in a second different computer, which connects to the first computer over a network. In the latter instance, the second computer provides the program instructions to the first computer for execution.

Also, the computer system 700 may take various forms, including a personal computer system, mainframe computer system, workstation, network appliance, Internet appliance, personal digital assistant (PDA), television system or other device. In general, the term "computer system" can be broadly defined to encompass any device having a processor, which executes instructions from a memory medium. The memory medium preferably stores a software program or programs for event-triggered transaction processing as described herein. The software program(s) may be implemented in any of various ways, including procedure-based techniques, component-based techniques, and/or object-oriented techniques, among others. For example, the software program may be implemented using ActiveX controls, C++ objects, JavaBeans, Microsoft Foundation Classes (MFC), or other technologies or methodologies, as desired.

Memory 710 may store program instructions accessed by the CPU 720. For example, instructions and data implementing a software documentation generator 705 may be stored in memory 710. Software documentation generator 705 may operate on application code files and files of various other types to produce software documentation sets.

Computer system 700 may further include other software and hardware components, such as an input/output (I/O) interface 725, that may be coupled to various other components and memory 710. The CPU 720 may acquire instructions and/or data through the I/O interface 1025. Through the I/O interface 725, the CPU 720 may also be coupled to one or more I/O components. As illustrated, I/O components may include a hard disk drive 730, a network adapter 735, a display adapter 740 and/or a removable storage adapter 745. Some components 730 to 745 may be coupled to the I/O interface 725. In addition, the computer system 700 may include one or more of a particular type of component. The computer system 700 may include one or more components coupled to the system through a component other than the I/O interface 725. Some computer systems may include additional and/or other components such as application software (e.g., stored in memory 710), other CPUs, video monitors or other displays, track balls, mice, keyboards, printers, plotters, scanners, or other types of I/O devices for use with computer system 700.

Various embodiments may further include receiving, sending or storing instructions and/or data implemented in accordance with the foregoing description upon a carrier medium. Generally speaking, a carrier medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or a wireless link.

The flow charts described herein represent exemplary embodiments of methods. The methods may be implemented in software, hardware, or a combination thereof. The order of method may be changed, and various elements may be added, reordered, combined, omitted, modified, etc.

Various modifications and changes may be made to the invention as would be obvious to a person skilled in the art having the benefit of this disclosure. It is intended that the following claims be interpreted to embrace all such modifications and changes and, accordingly, the specifications and drawings are to be regarded in an illustrative rather than a restrictive sense.

Although JSP tag libraries have been used as examples for sources, any type of file including software descriptive information may be used. Also, although XML has been used as an exemplary format for the uniformly formatted aggregate input document, other document formats or languages may be used for this document.

Various embodiments may further include receiving, sending or storing instructions and/or data implemented in accordance with the foregoing description upon a computer readable medium. Generally speaking, a computer readable medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or a wireless link.

What is claimed is:

1. A system, comprising:
   a processor; and
   memory coupled to the processor and configured to store program instructions executable by the processor to implement a software documentation generator configured to:
   input a plurality of sources related to a software program, wherein the plurality of sources comprises a plurality of different types of sources and comprises one or more of a software library documentation file for the software program or software program source code for the software program;
   implement an input source aggregator comprising a different input source plug-in for each different one of the plurality of different source types, wherein the input source aggregator is configured to:
   analyze the plurality of sources to identify a type of each of the sources;
   select a different one of the input source plug-ins for each different one of the plurality of different source types;
   using the selected input source plug-ins, extract information from the plurality of sources based on the type of the source;
   aggregate the information extracted by each selected input source plug-in into a uniform format; and
   pass the aggregated information in the uniform format to a transformer component of the software documentation generator; and
   implement the transformer component which comprises a plurality of different transformer plug-in sets, wherein each transformer plug-in set corresponds to one or more respective types of output software documentation sets, and each transformer plug-in set is configured to generate one or more respective output software documentation sets of a type to which the plug-in corresponds, wherein the transformer component is configured to:
   select one or more of the plurality of different transformer plug-in sets according to information specifying one or more desired output formats for one or more sets of software documentation for the software program;
   using the selected one or more transformer plug-in sets, transform the aggregated information in the uniform format into the one or more specified sets of software documentation for the software program in the one or more desired output formats;
   output the one or more specified sets of software documentation for the software program in the one or more desired output formats, wherein the one or more specified sets of software documentation document the functionality of the software program.

2. The system as recited in claim 1, wherein one of the sources comprises the software library documentation file.

3. The system as recited in claim 2, wherein the software library documentation file comprises a tag library descriptor (TLD).

4. The system as recited in claim 1, wherein one of the sources comprises the software program source code.

5. The system as recited in claim 1, wherein the documentation sets comprise documentation for one or more application programming interfaces (API) provided by a software library.

6. The system as recited in claim 1, wherein an input source plug-in is configured to generate information not included in the corresponding source file.

7. The system as recited in claim 1, wherein each input source plug-in is configured to output data in the uniform aggregate format.

8. The system as recited in claim 1, wherein the input source plug-ins are configured to produce a uniformly formatted aggregate input document and wherein each transformer plug-in set is configured to input data included in the uniformly formatted aggregate input document.

9. The system as recited in claim 8, wherein a transformer plug-in set is configured to generate information not included in the uniformly formatted aggregate input document.

10. The system as recited in claim 1, wherein the output software documentation sets comprise one or more text files.

11. The system as recited in claim 1, wherein the output software documentation sets comprise one or more portable document files (PDF).

12. The system as recited in claim 1, wherein the output software documentation sets comprise one or more hypertext markup language (HTML) files.

13. A method, comprising
   receiving information from multiple sources related to a software program, wherein the multiple sources comprise a plurality of different types of sources and comprise one or more of a software library documentation file for the software program and software program source code for the software program;

analyzing the information from each one of the multiple sources for type and data format; and selecting one or more of a plurality of different input source plug-ins based on said analyzing;

using the one or more selected input source plug-ins to extract the documentation data from the received information;

aggregating the extracted documentation data in a uniform format; and selecting, based on received information specifying an output documentation format, one of a plurality of transformer plug-in sets comprised within a transformer module that is passed the aggregated documentation data in the uniform format, wherein each selected transformer plug-in set corresponds to a specified output documentation format;

using the selected transformer plug-in set to translate a portion of the uniformly formatted aggregate data into one or more elements of a software documentation set in the specified output documentation format to transform the uniformly formatted documentation data into one or more specified documentation sets for the software program, wherein the one or more specified sets of software documentation document the functionality of the software program output the one or more specified sets of software documentation for the software program in the specified output documentation format.

14. The method as recited in claim 13, wherein one of the sources comprises the software library documentation file.

15. The method as recited in claim 14, wherein the software library documentation file comprises a tag library descriptor (TLD).

16. The method as recited in claim 13, wherein one of the sources comprises the software program source code.

17. The method as recited in claim 13, wherein the documentation sets comprise documentation for one or more application programming interfaces (APIs) provided by a software library.

18. The method as recited in claim 13, wherein said aggregating comprises:

if a uniformly formatted aggregate input document specifies information not comprised in data extracted from the source, generating said information; and generating a uniformly formatted aggregate input document.

19. The method as recited in claim 13, wherein the output software documentation sets comprise one or more text files.

20. The method as recited in claim 13, wherein the output software documentation sets comprise one or more portable document files (PDFs).

21. The method as recited in claim 13, wherein the output software documentation sets comprise one or more hypertext markup language (HTML) files.

22. A computer-accessible memory medium storing program instructions, wherein the program instructions are computer-executable to:

input a plurality of sources related to a software program, wherein the plurality of sources comprises a plurality of different types of sources and comprises one or more of a software library documentation file for the software program and software program source code for the software program;

analyze the one or more source files to identify the type of each of the source files;

select one or more of a plurality of input source plug-ins based on said analyzing to extract the information from the source;

use the selected one or more input source plug-ins to extract information from the plurality of sources based on the type of the source;

aggregate the extracted information into a uniform format; and select, based on received information specifying an output documentation format, one of a plurality of transformer plug-in sets comprised within a transformer module that is passed the aggregated documentation data in the uniform format, wherein each selected transformer plug-in set corresponds to a specified output documentation format;

use the selected transformer plug-in set to translate a portion of the uniformly formatted aggregate data into one or more elements of a software documentation set in the specified output documentation format to transform the aggregated information into one or more specified sets of software documentation for the software program, wherein the one or more specified sets of software documentation document the functionality of the software program output the one or more specified sets of software documentation for the software program in the specified output documentation format.

23. The computer-accessible medium as recited in claim 22, wherein one of the sources comprises the software library documentation file.

24. The computer-accessible medium as recited in claim 23, wherein the software library documentation file comprises a tag library descriptor (TLD).

25. The computer-accessible medium as recited in claim 22, wherein one of the sources comprises the software program source code.

26. The computer-accessible medium as recited in claim 22, wherein the documentation sets comprise documentation for one or more application programming interfaces (APIs) provided by a software library.

27. The computer-accessible medium as recited in claim 22, wherein to aggregate comprises to:

if a uniformly formatted aggregate input document specifies information not comprised in data extracted from the source, generate said information; and generate the uniformly formatted aggregate input document.

28. The computer-accessible medium as recited in claim 22, wherein the output software documentation sets comprise one or more text files.

29. The computer-accessible medium as recited in claim 22, wherein the output software documentation sets comprise one or more portable document files (PDFs).

30. The computer-accessible medium as recited in claim 22, wherein the output software documentation sets comprise one or more hypertext markup language (HTML) files.

* * * * *